(12) United States Patent
Huang et al.

(10) Patent No.: US 12,502,776 B2
(45) Date of Patent: Dec. 23, 2025

(54) SURGICAL ROBOT, AND SURGICAL ROBOT SYSTEM

(71) Applicant: CHONGQING JINSHAN MEDICAL ROBOTICS CO., LTD., Chongqing (CN)

(72) Inventors: Yu Huang, Chongqing (CN); Liao Wang, Chongqing (CN)

(73) Assignee: CHONGQING JINSHAN MEDICAL ROBOTICS CO., LTD., Chongqing (CN)

( * ) Notice: Subject to any disclaimer, the term of this patent is extended or adjusted under 35 U.S.C. 154(b) by 257 days.

(21) Appl. No.: 18/036,173

(22) PCT Filed: Nov. 2, 2021

(86) PCT No.: PCT/CN2021/128050
§ 371 (c)(1),
(2) Date: May 10, 2023

(87) PCT Pub. No.: WO2022/100479
PCT Pub. Date: May 19, 2022

(65) Prior Publication Data
US 2024/0009840 A1   Jan. 11, 2024

(30) Foreign Application Priority Data

Nov. 10, 2020  (CN) .......................... 202022585631.8
Nov. 10, 2020  (CN) .......................... 202022614461.1

(51) Int. Cl.
*B25J 9/16*     (2006.01)
*A61B 34/00*    (2016.01)
*A61B 34/37*    (2016.01)

(52) U.S. Cl.
CPC ............. *B25J 9/1664* (2013.01); *A61B 34/37* (2016.02); *A61B 34/77* (2016.02)

(58) Field of Classification Search
CPC ........ B25J 9/1664; A61B 34/37; A61B 34/77; A61B 17/34; A61B 2017/00477; A61B 2034/302; A61B 34/30
See application file for complete search history.

(56) References Cited

U.S. PATENT DOCUMENTS 9,469,034 B2 * 10/2016 Diolaiti ............ A61B 17/00234
2001/0013764 A1    8/2001 Blumenkranz et al.
(Continued)

FOREIGN PATENT DOCUMENTS

CN    209713138 U    12/2019
CN    209734151 U    12/2019
(Continued)

OTHER PUBLICATIONS

International Search Report for PCT/CN2021/128050 mailed Jan. 26, 2022, ISA/CN.
(Continued)

*Primary Examiner* — Jason Holloway
*Assistant Examiner* — Madison B Emmett
(74) *Attorney, Agent, or Firm* — Yue (Robert) Xu; Apex Attorneys at Law, LLP (57) ABSTRACT

A surgical robot and a surgical robot system is disclosed. The surgical robot comprises a first robot arm, a second robot arm connected to the end of the first robot arm and used for mounting and controlling the motion posture of a surgical instrument, and a controller that controls the motion of the axes of the first robot arm and the second robot arm, wherein the end of the first robot arm is provided with a linear guide portion for the second robot arm to move linearly; and the first robot arm is connected to the end of the linear guide portion that is close to the second robot arm and used for mounting an end of the surgical instrument.

16 Claims, 7 Drawing Sheets

(56) References Cited

U.S. PATENT DOCUMENTS

| | | | |
|---|---|---|---|
| 2010/0204713 | A1 | 8/2010 | Ruiz Morales |
| 2011/0166706 | A1* | 7/2011 | Prisco .................... B25J 9/1689 |
| | | | 700/254 |
| 2016/0120611 | A1 | 5/2016 | Lohmeier |
| 2017/0239005 | A1* | 8/2017 | Cohen .................... A61B 34/30 |
| 2018/0116737 | A1 | 5/2018 | Bajo et al. |
| 2019/0231458 | A1 | 8/2019 | Dimaio et al. |
| 2020/0121403 | A1 | 4/2020 | Awano et al. |
| 2020/0170730 | A1* | 6/2020 | Cameron ................ A61B 34/30 |
| 2021/0030509 | A1* | 2/2021 | McDowall ......... G02B 27/0176 |
| 2021/0244489 | A1* | 8/2021 | Lim ....................... B25J 18/007 |
| 2021/0330405 | A1* | 10/2021 | Gonenc ................. B25J 9/0096 |
| 2021/0369359 | A1* | 12/2021 | Blanckaert ............. A61B 34/77 |
| 2022/0370165 | A1* | 11/2022 | Cuthbertson .......... B25J 13/065 |
| 2023/0014033 | A1 | 1/2023 | Tojo et al. |

FOREIGN PATENT DOCUMENTS

| | | |
|---|---|---|
| CN | 210056222 U | 2/2020 |
| CN | 111227938 A | 6/2020 |
| CN | 211484896 U | 9/2020 |
| CN | 213851025 U | 8/2021 |
| CN | 213851026 U | 8/2021 |
| EP | 3639782 A1 | 4/2020 |
| EP | 4070918 A1 | 10/2022 |
| WO | 2020034146 A1 | 2/2020 |

OTHER PUBLICATIONS

The European search report issued on Sep. 16, 2024 for EP21891006.5.

* cited by examiner

SURGICAL ROBOT, AND SURGICAL ROBOT SYSTEM

This disclosure is a national phase application of PCT international patent application PCT/CN2021/128050, filed on Nov. 2, 2021 which claims the disclosure of priorities to the following two Chinese patent disclosures, both of which are incorporated herein by reference, 1) Chinese Patent Disclosure No. 202022614461.1, titled "SURGICAL ROBOT", filed with the China National Intellectual Property Administration on Nov. 10, 2020; and 2) Chinese Patent Disclosure No. 202022585631.8 titled "SURGICAL ROBOT SYSTEM", filed with the China National Intellectual Property Administration on Nov. 10, 2020

FIELD

The present disclosure relates to the technical field of medical instruments, in particular to a surgical robot and a surgical robot system.

BACKGROUND

A minimally invasive surgical robot can reduce the physical labor of a doctor during the surgery, and achieve the purpose of precise surgery, so that a patient has less trauma, less blood loss, less postoperative infection and faster postoperative recovery. A master-slave control mode is generally used by the minimally invasive surgical robot: when the operator operates the master hand, the hand motion will drive the master hand to move accordingly, a sensor at a joint of the master hand can measure motion information, and the master-slave control algorithm maps the motion of the master hand to the slave hand, and joints of the slave hand is passively moved, which drives a surgical instrument to achieve corresponding motion. In a minimally invasive surgery, due to the limitations of the surgical wound and the surgical space, the motion of each axis of the surgical robot is limited, resulting in inflexible motion of an end of the surgical robot. Multiple surgical robots are often used during the surgery of the patient, which can easily interfere with each other. Moreover, a volume of the whole equipment is too large, and mounting and debugging are relatively complex. Especially in the minimally invasive surgery, due to the limitations of the surgical wound and the surgical space, the motion is limited and less flexible, which is prone to result in interference. When the machine is pulled out from the surgical wound, a multi-axis linkage is required to complete the linear motion, which may cause secondary damage to the surgical wound.

Therefore, how to prevent multiple surgical robots from interfering with each other and how to provide a surgical robot system which is simple, convenient, flexible-to-use and easy to linearly enter and exit a surgical wound are technical problems that need to be solved urgently by those skilled in the art.

SUMMARY

An object according to the present disclosure is to provide a surgical robot, which can reduce the motion amplitude of each axis while ensuring a surgical instrument to complete the surgical operation, so as to prevent multiple surgical robots from interfering with each other during the surgery. Another object according to the present disclosure is to provide a surgical robot system, which can adjust a position and a posture of the instrument robot in the space through the universal robot, and further adjust a position and a posture of the surgical instrument in the human body through the instrument robot. The linkage control mode is simple and convenient with a flexible use. The linear joint ensures that the instrument body moves straight in and out when entering and exiting the human body, and the linear motion mode does not need multi-axis linkage, so as to avoid secondary injury to the surgical wound.

In order to achieve the above objects, a surgical robot is provided according to the present disclosure, which includes a first robot arm, a second robot arm that is connected to a tail end of the first robot arm and used for mounting a surgical instrument and controlling a posture of the motion of the surgical instrument, and a controller that controls the motion of each axis of the first robot arm and the second robot arm;

the tail end of the first robot arm is provided with a linear guide portion for the second robot arm to move linearly, and the first robot arm is connected to one end of the linear guide portion that is close to the second robot arm and used for mounting the surgical instrument.

In an embodiment, the first robot arm is detachably connected with the linear guide portion, and/or, the second robot arm is detachably connected with the linear guide portion.

In an embodiment, the first robot arm includes at least five motion axes.

In an embodiment, rotation planes of any two adjacent motion axes of the first robot arm are perpendicular to each other.

In an embodiment, the first robot arm includes a base and multiple rotary joints, and the multiple rotary joints are sequentially connected end to end.

In an embodiment, a joint encoder for detection a rotation angle is provided at each axis of the first robot arm and the second robot arm, a displacement detection mechanism for detecting a linear displacement of the second robot arm along the linear guide portion is provided at the linear guide portion, and all the joint encoders and the displacement detection mechanism are connected to the controller.

In an embodiment, the controller includes a first controller for controlling the motion of each axis of the first robot arm and a second controller for controlling the motion of the second robot arm, and the displacement detection mechanism is connected to the second controller.

In an embodiment, the displacement detection mechanism is a displacement sensor or an encoder.

Compared with the conventional technology, the surgical robot according to the present disclosure includes the first robot arm and the second robot arm. The second robot arm is configured to mount the surgical instrument. After a trocar is passed through a surgical wound of a patient, and a trocar seat is connected with the trocar, the second robot arm can control the surgical instrument to pass through the trocar and enter the body of the patient to complete the corresponding surgical operation. The first robot arm enables the second robot arm that controls the motion of the surgical instrument to move around the trocar through the motion of axes. When the surgical instrument mounted at the tail end of the second robot arm is aligned with the trocar, the linear guide portion drives the second robot arm to feed the surgical instrument into the body of the patient, and the controller controls the first robot arm and the second robot arm to move. According to the present disclosure, the first robot arm is connected to the end of the linear guide portion which is close to the surgical instrument, so that actions, such as pitching and swinging, generated by the rotation of axes of the first robot arm are amplified at the end of the surgical instrument, and the first robot arm can move the second robot arm and the surgical instrument in place with a small motion amplitude, which improves the motion flexibility of the end of the surgical robot, reduces the motion amplitude of the surgical robot, especially the first robot arm, and prevent multiple surgical robots from interfering with each other during the surgery.

In order to achieve the above objects, a surgical robot system is provided according to the present disclosure, which includes a universal robot and an instrument robot which are connected. The universal robot is configured to adjust a position and a posture of the instrument robot. The instrument robot includes an instrument body and a linear joint which are connected, the linear joint is configured to adjust a position of the instrument body along a linear direction, and the instrument body is configured to adjust a posture of the surgical instrument at an end of the linear joint and perform a setting operation.

In an embodiment, the linear joint has a translational degree of freedom, and the linear joint includes a linear slide block and the linear guide portion which are assembled slidably.

In an embodiment, the universal robot is connected with the linear guide portion, and the instrument body is connected with the linear slide block.

In an embodiment, the universal robot is provided with a universal robot tail end flange for connecting with the linear guide portion, and the instrument body is provided with an instrument robot tail end flange for connecting with the linear slide block.

In an embodiment, the surgical robot system includes a trocar seat which is arranged on the linear guide portion, and a trocar which is arranged on the instrument body, and the trocar seat is configured to position and fix the trocar.

In an embodiment, the surgical robot is a four-axis robot with the linear joint, a third instrument joint, a fourth instrument joint and a fifth instrument joint, and the linear joint, the third instrument joint, the fourth instrument joint and the fifth instrument joint are connected in sequence.

In an embodiment, the third instrument joint, the fourth instrument joint and the fifth instrument joint all have a rotational degree of freedom.

In an embodiment, the number of axes of the universal robot is greater than or equal to five.

In an embodiment, any axis of the universal robot has a rotational degree of freedom or a linear degree of freedom.

Compared with the above known technology, the surgical robot system according to the present disclosure includes the universal robot and the instrument robot, and the universal robot is connected with the instrument robot. The instrument robot includes the instrument body and the linear joint, and the instrument body is connected with the linear joint. In the surgical robot system, the universal robot is configured to drive the instrument robot to move to the trocar at the surgical opening. After the trocar seat is connected with the trocar at the surgical opening, the linear joint guides the surgical instrument located at the tail end of the instrument body into the human body, and a position of the tail end (a telecentric point) of the universal robot remains unchanged after the trocar is connected. The independent control of the posture of the instrument is realized by the instrument robot, the linkage control of the position of the instrument is realized by the universal robot and the linear joint, and the linkage control mode is simple, convenient with flexible use. The linear joint ensures that the instrument body moves straight in and out when entering and exiting the human body, and the linear motion mode does not need multi-axis linkage, so as to avoid secondary injury to the surgical wound.

BRIEF DESCRIPTION OF THE DRAWINGS

For more clearly illustrating embodiments of the present disclosure or the technical solutions in the conventional technology, drawings to be used in the description of the embodiments or the conventional technology will be briefly described hereinafter. Apparently, the drawings in the following description are only some embodiments of the present disclosure. For those skilled in the art, other drawings may be obtained based on the provided drawings without any creative work.

Reference numerals in FIGS. 1 to 2 are listed as follows.

| | |
|---|---|
| 1-01 trocar; | 1-11 base, |
| 1-12 first rotary joint; | 1-13 second rotary joint; |
| 1-14 third rotary joint; | 1-15 fourth rotary joint; |
| 1-16 fifth rotary joint; | 1-1 linear guide portion; |
| 1-21 linear slide block; | 1-3 flange; |
| 1-4 surgical instrument; | 1-5 instrument seat. |

Reference numerals in FIGS. 3 to 9 are listed as follows.

| | |
|---|---|
| 2-1 universal robot; | 2-2 instrument robot; |
| 2-11 universal robot tail end flange; | 2-12 first universal joint; |
| 2-13 second universal joint; | 2-14 third universal joint; |
| 2-15 fourth universal joint; | 2-16 fifth universal joint; |
| 2-17 sixth universal joint; | 2-18 seventh universal joint; |
| 2-20 first instrument joint; | 2-21, linear joint; |
| 2-23 instrument body; | 2-211 linear guide portion; |
| 2-212 linear slide block; | 2-231 instrument robot tail end flange; |
| 2-232 third instrument joint; | 2-233 fourth instrument joint; |
| 2-234 fifth instrument joint; | 2-241 trocar seat; |
| 2-242 trocar. | |

DETAILED DESCRIPTION OF THE EMBODIMENTS

Technical solutions of embodiments of the present disclosure are clearly and completely described hereinafter in conjunction with the drawings of the embodiments of the present disclosure. Apparently, the embodiments described in the following are only some embodiments of the present disclosure, rather than all embodiments. Based on the embodiments in the present disclosure, all of the other embodiments which are obtained by those skilled in the art without any creative work fall within the protection scope of the present disclosure.

In order to provide the person skilled in the art with a better understanding of the solution of the present disclosure, the present disclosure is described hereinafter in further detail in conjunction with the drawings and embodiments.

A minimally invasive surgery refers to a surgery performed by implanting a slender endoscope and a tiny surgical instrument into the body of the patient through a small incision. The surgeon can observe the position of the surgical instrument and the surgical process during the surgery by using a visual inspection device. Compared with the conventional open surgery, the minimally invasive surgery has the advantages of small surgical wound, relieving the pain of the patient and quick recovery after the surgery.

A surgical robot system is a robot system that can perform minimally invasive surgery, which mainly includes a master manipulator (i.e., a master-hand robot), a slave manipulator (i.e., a slave-hand robot), and a control system. The master-hand robot is controlled by a doctor to generate a position and posture signal, which is collected and processed to obtain a position and posture signal for controlling the slave-hand robot, and then the surgical operation is conducted by the slave-hand robot. An object according to the present disclosure is to provide a surgical robot (a slave-hand robot), so as to solve the problems of inconvenient motion and mutual interference of the surgical robots.

In order to provide the person skilled in the art with a better understanding of the solution of the present disclosure, the present disclosure is described hereinafter in further detail in conjunction with the drawings and embodiments.

Figure 1:
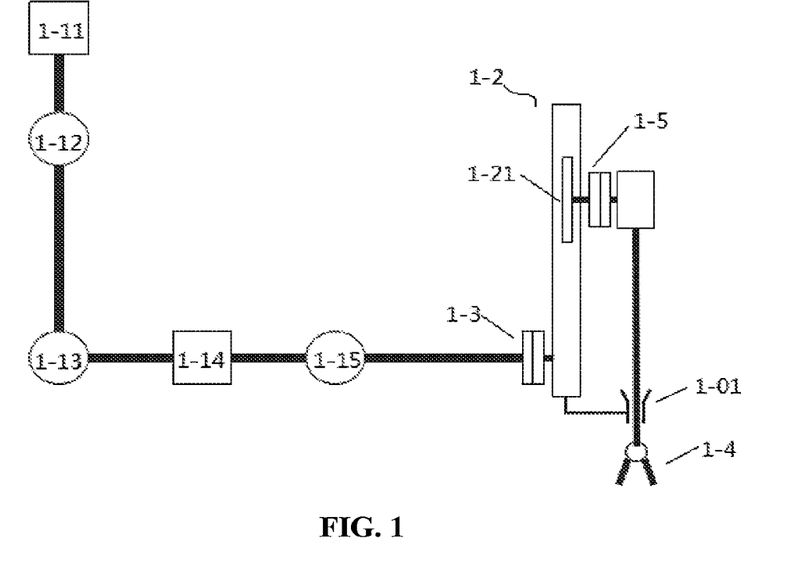
FIG. 1 is a schematic view of a surgical robot according to an embodiment of the present disclosure.
Figure 2:
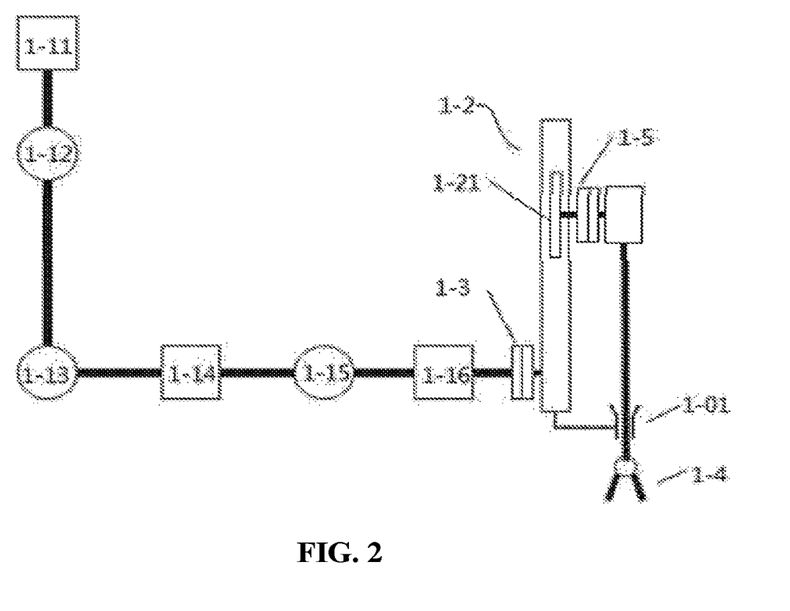
FIG. 2 is a schematic view of the surgical robot according to another embodiment of the present disclosure.

Referring to FIG. 1 and FIG. 2, FIG. 1 is a schematic view of a surgical robot according to an embodiment of the present disclosure, and FIG. 2 is a schematic view of the surgical robot according to another embodiment of the present disclosure.

The surgical robot according to the present disclosure includes a first robot arm and a second robot arm. An end of the first robot arm is provided with a linear guide portion 1-2, and the second robot arm is connected with the linear guide portion 1-2 and moves linearly along the linear guide portion 1-2 under the position-limiting of the linear guide portion 1-2. The surgical robot further includes a controller that controls motions of the first robot arm and the second robot arm. In generally, the first robot arm generally includes five degrees of freedom, so as to meet the rotation requirement of a surgical instrument 1-4 mounted at an end of the second mechanical arm around a surgical wound of the patient, that is, a fixed position of a trocar 1-01 (a laparoscopic puncture device). With the help of the linear guide portion 1-2, the surgical instrument 1-4 at the end of the second mechanical arm passes through the trocar 1-01 and enters the body of the patient. Through the action of the first robot arm, the surgical instrument 1-4 rotates around the position of the trocar 1-01 without changing a spatial position of the trocar 1-01 relative to the surgical wound, and the action of the second mechanical arm drives the surgical instrument 1-4 to complete corresponding operations such as cutting, puncturing, suturing and the like.

In the surgical robot according to the present disclosure, the second robot arm is connected to the linear guide portion 1-2, and can be driven by the linear guide portion 1-2 to send the surgical instrument 1-4 into the body of the patient and control the surgical instrument 1-4 to perform specific operations. In other words, the second robot arm is substantially parallel to the linear guide portion 1-2. The first robot arm is connected to an end of the linear guide portion 1-2 that is close to the second robot arm for mounting the surgical instrument 1-4, that is, an end of the linear guide portion 1-2 that is close to the trocar seat, so that the action of the surgical instruments 1-4 is amplified when the first robot arm acts, and the controller can realize the variation of the position of the end of the surgical instrument 1-4 by controlling axes of the first robot arm with a small motion, which improves the flexibility of the motion of the surgical instrument 1-4 of the surgical robot, avoids mutual interference between multiple surgical robots, especially with the first robot arm, and ensures the smooth completion of the surgery.

The surgical robot according to the present disclosure is described in detail in conjunction with the accompanying drawings and specific embodiments.

In an embodiment of the present disclosure, the first robot arm being a five-axis robot as shown in FIG. 1 is described as an example. That is, the first robot arm includes at least five degrees of freedom of motion. Through the motion of the first robot arm, two orthogonal virtual rotation axes are generated at a position where the second robot arm passes through the trocar 1-10, that is, at the a telecentric point, so as to control a position and a posture of the surgical instrument 1-4. The feed of the second robot arm is controlled by the linear guide portion 1-2, in order to control a depth of the surgical instrument 1-4 entering the human body. An instrument seat 1-5 is mounted at the end of the second robot arm, the surgical instrument 1-4 is mounted at the end of the second robot arm through the instrument seat 1-5, and the controller controls the action of the surgical instrument 1-4 through the second robot arm. The mounting of the second robot arm and the surgical instrument 1-4 and the arrangement of the controller can refer to the prior art.

The mounting position relationship of the first robot arm, the linear guide portion 1-2 and the second robot arm is as shown in FIG. 1. it should be noted that, the terms "upper end" and "lower end" in this embodiment are all referred to relative to FIG. 1. The surgical instrument 1-4 is mounted at the tail end (a lower end) of the second robot arm, the second robot arm is connected to an upper end of the linear guide portion 1-2, and the first robot arm is connected to a lower end of another side of the linear guide portion 1-2, that is, is arranged close to the trocar seat, so as to amplify the motion of the surgical instrument 1-4 when the first robot arm moves.

In the above embodiment, the first robot arm and the linear guide portion 1-2 are detachably connected by using assembly method such as flanges 1-3 and bolts, and the second robot arm and the linear guide portion 1-2 are detachably connected by using assembly method such as flanges 1-3 and bolts, so as to facilitate the selection and replacement of different models of the first robot arm or the second robot arm according to the surgical needs of patients.

Since the arrangement of the second robot arm needs to ensure that the surgical instrument 1-4 stays stationary at the position where it passes through the trocar 1-01, the first robot arm includes at least five motion axes, and not only the structure of the above five-axis robot can be adopted, but also a six-axis robot or a seven-axis robot can be adopted as needed to improve the control accuracy of the end of the second robot arm, that is, the end of the surgical instrument 1-4.

No matter the first robot arm is a five-axis robot or a six-axis robot, rotation planes of the adjacent motion axes of the first robot arm can be connected perpendicularly (orthogonally). The first robot arm includes a base 1-11, which is rotatably connected with a rotary joint 1-12. The reference coordinate system of the right-hand base 1-11 is established based on the base 1-11, and a rotary motor is provided in the base 1-11, which drives a first rotary joint 1-12 to rotate in the XOY plane of the reference coordinate system of the right-hand base 1-11, an end of the first rotary joint 1-12 is arranged perpendicular to the Z axis, and the first rotary joint 1-12 is rotatably connected with a second rotary joint 1-13. The first rotary joint 1-12 is provided with a rotary motor which is perpendicular to the Z axis. The rotary motor in the first rotary joint 1-12 drives the second rotary joint 1-13 to rotate or swing in a plane perpendicular to the XOY plane. The second rotary joint 1-13, the third rotary joint 1-14, the fourth rotary joint 1-15 and the fifth rotary joint 1-16 are connected end to end in sequence. A fitting portion, which is fixedly connected with the linear guide portion 1-2, is provided at a tail end of the rotary joints at a tail end of the first robot arm (such as the fourth rotary joint 1-15 or the fifth rotary joint 1-16), and the fitting portion may be the flange 1-3 as described above. In addition, the rotation planes of the adjacent motion axes may be connected obliquely. Relatively speaking, the orthogonal arrangement of the rotation planes of adjacent rotation axes facilitates coordinate system conversion and rotation control of each rotation axis.

In order to optimize the above embodiments and improve the rotation accuracy of each axis, a joint encoder for detecting a rotation angle is provided at each axis, that is, each rotary joint, of the first robot arm and second robot arm, and a displacement detection mechanism for detecting a linear displacement of the second robot arm along the linear guide portion 1-2 is provided at the linear guide portion 1-2. All the joint encoders and the displacement detection mechanism are connected to the controller, and the controller can control the motion accuracy of the first robot arm and the second robot arm by feeding back the rotation angle and the linear displacement, so as to improve the accuracy of the surgery.

A linear guide rail and a linear slide block 1-21 are provided in the linear guide portion 1-2, the linear slide block 1-21 is driven by a driving motor to move along the linear guide rail, to further drive the second robot arm of the linear slide block 1-21 to move. The linear guide portion 1-2 is provided with a trocar seat, which is connected with a trocar 1-01 punctured at the surgical wound of the patient, and the connection operation is fed back to the controller, which can establish the position-limiting of the controller on each axis of the first robot arm and the second robot arm, ensure that the first robot arm moves only around the trocar, and ensure that the spatial position of the trocar 1-01 relative to the surgical wound of the patient remains stationary, The displacement detection mechanism may be a capacitive displacement sensor, a linear grating or a LVDT displacement sensor and an encoder. Taking the LVDT as an example, the LVDT displacement sensor is composed of an iron core, an armature, a primary coil, and secondary coils. The primary coil and the secondary coils are distributed on a coil frame, and there is a freely movable rod-shaped armature inside the coil. When the armature is in the middle position, the induced electromotive forces generated by the two secondary coils are equal, so that an output voltage is 0. When the armature moves inside the coil and deviates from the middle position, the induced electromotive forces generated by the two coils are unequal.

In order to improve the sensitivity, linearity and linear range of the LVDT displacement sensor, two secondary coils are connected in reverse series, and the voltage polarities of the two secondary coils are opposite. The output voltage of the LVDT displacement sensor is the difference of the voltages of the two secondary coils, and the output voltage is linearly related to the displacement of the rod-shaped armature. The detection of the linear displacement of the second robot arm can be completed by fixedly connecting the rod-shaped armature with the linear slide block 1-21. It should be noted that the displacement detection mechanism is arranged based on the conventional technology. In this embodiment, the displacement of the first robot arm is detected only by arranging the displacement detection mechanism at the linear guide portion 1-2.

The controller specifically includes a first controller which is configured to control the motion of each rotary motor of the first robot arm and a second controller which is configured to control the motion of the second robot arm. The second controller is further connected with the displacement sensor, and controls the driving motor to adjust the feed of the second robot arm and the surgical instrument 1-4 by detecting the displacement of the linear slide block 1-21 through the displacement sensor. When the second robot arm is fed in place, the precise adjustment of each rotary motor of the first robot arm is realized through the feedback of the joint encoder. The corresponding surgical operation is completed by cooperating with the second controller to control the action of the surgical instrument 1-4.

Figure 3:
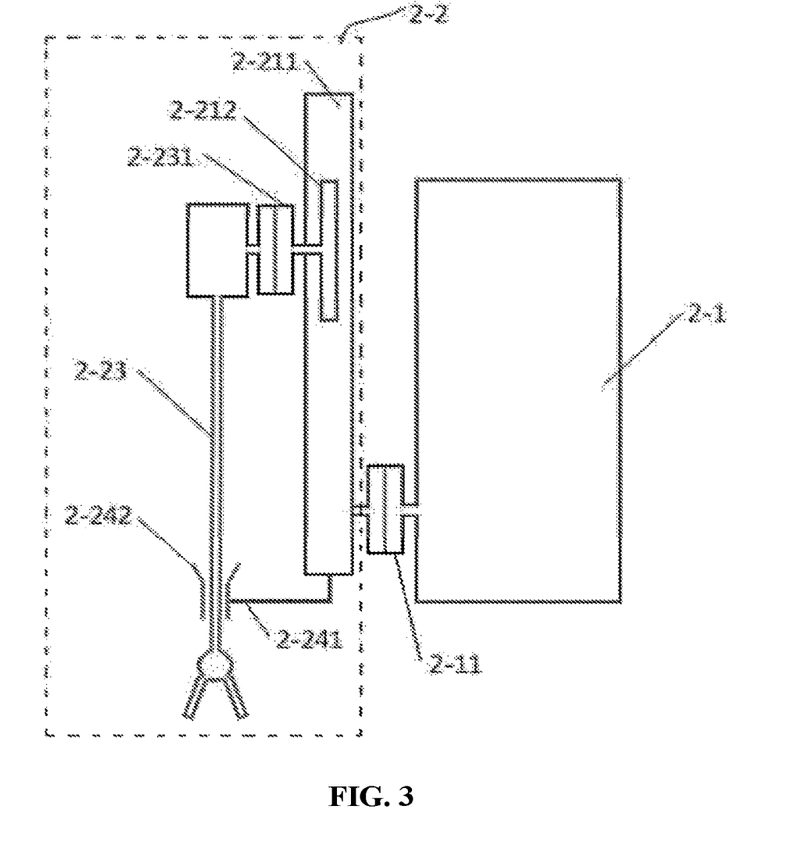
FIG. 3 is a schematic structural view of a surgical robot system according to an embodiment of the present disclosure.
Figure 4:
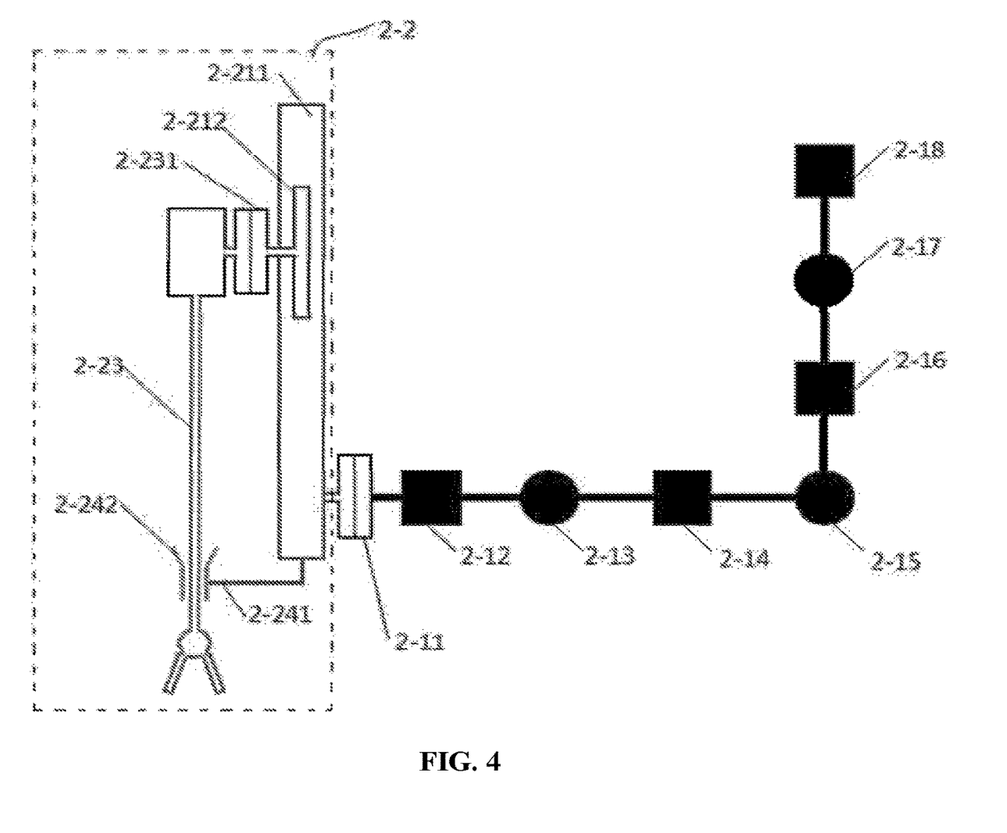
FIG. 4 is a schematic structural view of the surgical robot system according to an embodiment of the present disclosure.
Figure 5:
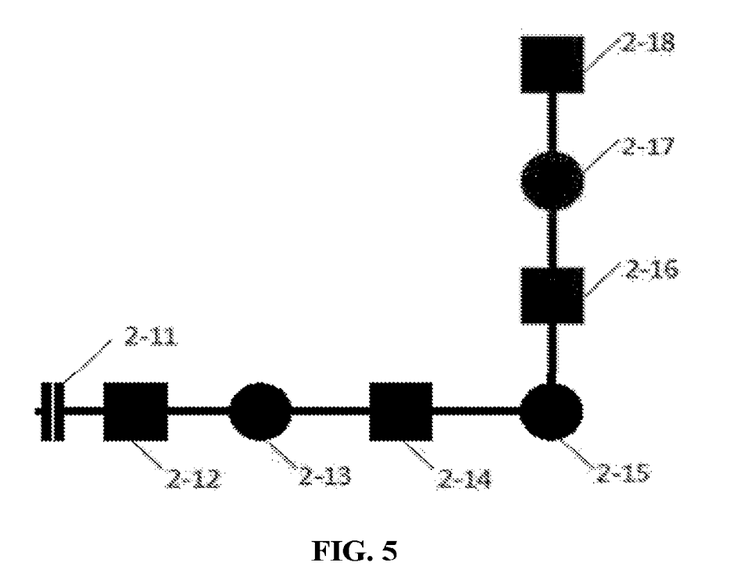
FIG. 5 is a schematic structural view of a first embodiment of a universal robot in FIG. 3.
Figure 6:
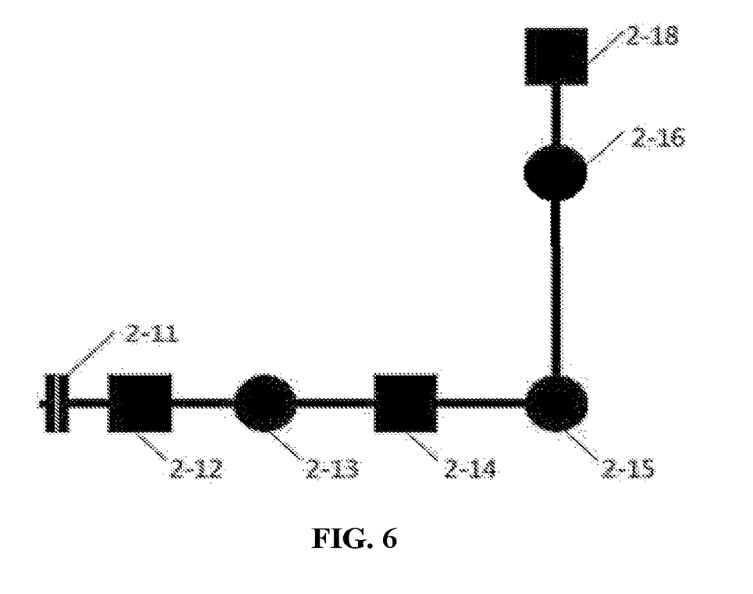
FIG. 6 is a schematic structural view of a second embodiment of the universal robot in FIG. 3.
Figure 7:
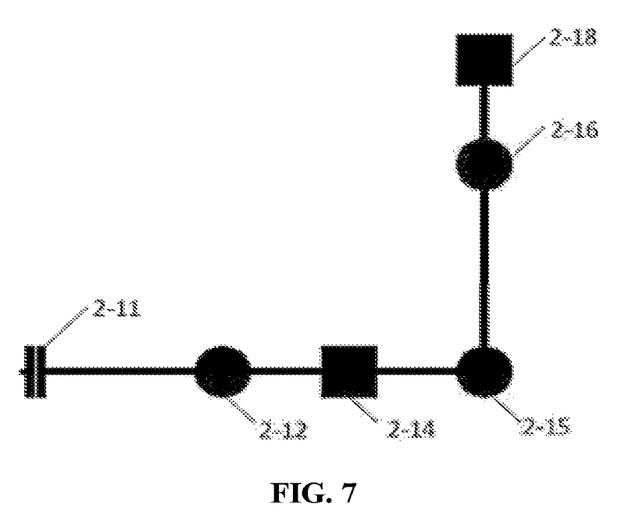
FIG. 7 is a schematic structural view of a third embodiment of the universal robot in FIG. 3.
Figure 8:
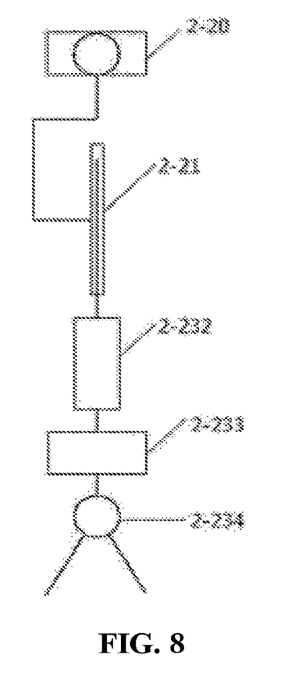
FIG. 8 is a schematic structural view of an instrument robot in FIG. 3.
Figure 9:
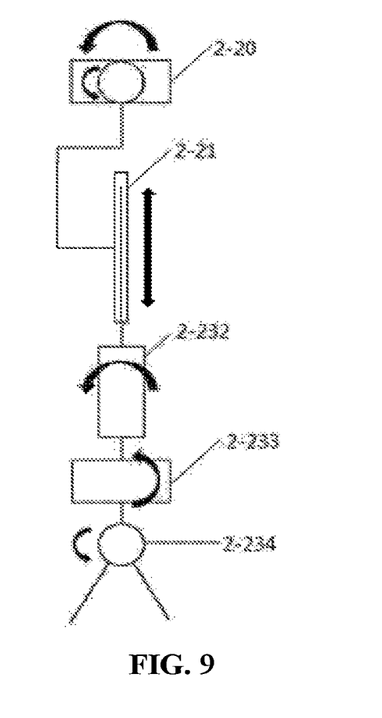
FIG. 9 is a schematic view showing the motion of the instrument robot in FIG. 8.

Referring to FIG. 3 to FIG. 9, FIG. 3 is a schematic structural view of a surgical robot system according to an embodiment of the present disclosure, FIG. 4 is a schematic structural view of the surgical robot system according to an embodiment of the present disclosure, FIG. 5 is a schematic structural view of a first embodiment of a universal robot in FIG. 3, FIG. 6 is a schematic structural view of a second embodiment of the universal robot in FIG. 3, FIG. 7 is a schematic structural view of a third embodiment of the universal robot in FIG. 3, FIG. 8 is a schematic structural view of an instrument robot in FIG. 3, and FIG. 9 is a schematic view showing the motion of the instrument robot in FIG. 8.

In a specific embodiment, a surgical robot system according to the present disclosure includes a universal robot 2-1 and an instrument robot 2-2, and the universal robot 2-1 and the instrument robot 2-2 are mechanically connected. The universal robot 2-1 can drive the instrument robot 2-2 to achieve any motion in space. Through the motion of the universal robot 2-1 and a linear joint 2-21, the connected instrument robot 2-2 is driven to synchronously move, so as to further adjust the position of the tail end of the surgical instrument of the instrument robot 2-2.

The instrument robot 2-2 includes an instrument body 2-23 and a linear joint 2-21, and the instrument body 2-23 and the linear joint 2-21 are mechanically connected. The linear joint 2-21 is configured to drive the instrument body 2-23 to achieve directional motion along a linear direction. Through the motion of the linear joint 2-21, the instrument robot 2-23 connected with the linear joint 2-21 is driven to move linearly synchronously, so as to further adjust a position of the instrument body 2-23 along the linear direction. Accordingly, the position of the instrument body 2-23 fixed at the end of the linear joint 2-21 is changed by the driving of the linear joint 2-21, so that the position of the end of the surgical instrument in the human body is further changed. The instrument body 2-23 controls itself to adjust the posture of the tail end of the surgical instrument, so as to conduct subsequent setting operations such as surgical operation. The object of the surgical operation includes a simulated surgery on a target object such as a dummy, or the surgical operation can be applied to a real surgery on the human body.

It should be further noted that, the core function of the universal robot 2-1 is to control the instrument robot 2-2 to move around the surgical opening of the patient. The linear joint 2-21 is linked with the universal robot 2-1 to control a position of the surgical instrument at the end of the instrument robot 2-2. A posture of the surgical instrument is only independently controlled by the instrument robot 2-2.

In addition, the surgical robot system further includes controllers, which can be configured as one single controller to control the universal robot 2-1 and the instrument robot 2-2, or independently configured as two controllers to control the universal robot 2-1 and the instrument robot 2-2 respectively, so as to realize the control and the motion of the universal robot 2-1 and the instrument robot 2-2. The realization and control of the motion, including but not limited to a motion direction or a motion rate about a specific rotary axis or a linear axis, should be set according to the specific mechanical structures of the universal robot 2-1 and the instrument robot 2-2, that is, the control mode and program setting of the controller should not be limited to the specific structure of a robot in a certain type, but should be varied with the various mechanism, which also belong to the description scope of this embodiment.

In this embodiment, during the surgical operation of the universal robot 2-1, the universal robot 2-1 drives the instrument robot 2-2 to move, and the universal robot 2-1 drives the instrument robot 2-2 to the trocar 2-242 at the surgical opening. After the trocar seat 2-241 is connected with the trocar 2-242, the position of the tail end (the telecentric point) of the universal robot 2-1 remains unchanged, the linear feeding and retraction of the instrument body 2-23 is realized by the universal robot 2-21, and a position of the instrument body 2-23 is adjusted by the universal robot 2-1 together with the linear joint 2-21. On this basis, after the position of the instrument body 2-23 is adjusted in place, a posture of the instrument body 2-23 is independently controlled by the instrument robot 2-2, that is, the instrument robot 2-2 itself, so as to conduct the control operation of the surgery.

In addition, the retraction process after the surgery is completed is opposite to the above process. Firstly, the posture is independently controlled and adjusted by the instrument body 2-23, then the position is adjusted by the universal robot 2-1 together with the linear joint 2-21, the instrument body 2-23 is taken out, and the instrument robot 2-2 is removed from the surgical space.

Compared with the surgical robot in the conventional technology, a combination of the universal robot 2-1 and the instrument robot 2-2 is used according to the present disclosure, which realizes the object that the universal robot 2-1 controls the instrument robot 2-2 to move around the surgical opening of the patient by refining the functions of different robots. The linear joint 2-21 is linked with the universal robot 2-1 to control the position of the surgical instrument at the end of the instrument robot 2-2, and the linkage control mode is simple, convenient and flexible to use. The linear joint 2-21 ensures that the instrument body 2-23 moves straight in and out when entering and exiting the human body, without the need for multi-axis linkage, thus avoiding secondary injury to the surgical wound. The posture of the surgical instrument is only independently controlled by the instrument robot 2-2.

It should be noted that a master-slave control mode is generally used in the surgical robot system. The doctor directly operates the master-hand and maps the motion of the master hand to the slave-hand, which directly drives the surgical instrument to achieve corresponding motion. The surgical robot system in this embodiment is equivalent to the slave-hand above, and the master-hand can refer to conventional technology, which is not involved in this embodiment and is not described in detail herein.

In this embodiment, the linear joint 2-21 has one degree of freedom and is a translational degree of freedom, in other words, the linear joint 2-21 has one translational degree of freedom, and the linear joint 2-21 can adopt a linear motion module, such as a telescopic rod controlled by an electric cylinder or an air cylinder or a slide rail. For example, the linear joint 2-21 includes a linear slide block 2-212 and a linear guide portion 2-211 which are assembled slidably, and the linear guide portion 2-211 has a motor that drives and controls the linear slide block 2-212 to move linearly.

Specifically, the universal robot 2-1 is connected with the linear guide portion 2-211, and the instrument body 2-23 is connected with the linear slide block 2-212. That is, the instrument body 2-23 is mounted on the universal robot 2-1 through the linear slide block 2-212 and the linear guide portion 2-211, and the universal robot 2-1 controls the positions and the postures of the instrument body 2-23, the linear slide block 2-212 and the linear guide portion 2-211, and then the linear guide portion 2-211 controls the positions of the linear slide block 2-212 and the instrument body 2-23.

In this embodiment, the surgical robot system according to the present disclosure can reduce the motion amplitude of each axis while ensuring the surgical instrument to complete the surgery, improve the motion flexibility of the end of the instrument, and prevent adjacent surgical robots from interfering with each other.

For example, the universal robot 2-1 may be directly connected with the linear guide portion 2-211 or connected with the linear guide portion 2-211 by providing an universal robot tail end flange 2-211. Similarly, the instrument body 2-23 is provided with an instrument robot tail end flange 2-231 for connecting with the linear slide block 2-212.

In this embodiment, the surgical robot system includes a trocar seat 2-241 which is arranged on the linear guide portion 2-211, and a trocar 2-242 which is arranged on the instrument body 2-23, and the trocar seat 2-241 is configured to position and fix the trocar 2-242. By connecting the trocar seat 2-241 with the trocar 2-242 at the surgical wound of the patient and feeding the actual position back to the controller, the motion restriction of the controller to each axis of the universal robot 2-1 and the instrument robot 2-2 is established. A position of the connected trocar 2-242 in space always coincides with the position of the surgical wound of the patient in space, thus ensuring that the position where the instrument robot 2-2 passes through the trocar 2-242 remains stationary.

In the specific process, the trocar 2-242 is passed through the surgical wound of the patient. After the trocar seat 2-241 is connected with the trocar 2-242, the instrument robot 2-2 can control the instrument body 2-23 to pass through the trocar 2-242 and enter the body of the patient to complete the corresponding surgical operation. The universal robot 2-1 enables the instrument robot 2-2 to move around the trocar 2-242 through the motion about each axis. When the instrument body 2-23 of the instrument robot 2-2 is aligned with the trocar 2-242, the linear guide portion 2-211 drives the instrument body 2-23 into the body of the patient body to conduct the subsequent surgical operations.

It should be noted that the improvement of this embodiment not only lie in the combination of the universal robot 2-1 and the instrument robot 2-2, but also in the optimization of the further arrangement of the universal robot 2-1 and the instrument robot 2-2.

For example, the instrument robot 2-2 is a four-axis robot with a linear joint 2-21, a third instrument joint 2-232, a fourth instrument joint 2-233 and a fifth instrument joint 2-234, which are connected in sequence. Each axis of the robot is controlled by a corresponding controller to realize the motion.

Specifically, at the algorithmic control level, the instrument robot 2-2 includes four physical axes of the above four axes, and further includes two orthogonal virtual axes of another two axes. The instrument robot 2-2 has five joints with four physical axes and two orthogonal virtual axes, which includes a first instrument joint 2-20, a linear joint 2-21, a third instrument joint 2-232, a fourth instrument joint 2-233 and a fifth instrument joint 2-234. The first instrument joint 2-20 is equivalent to the two orthogonal virtual axes, and the actions of the virtual axes are composed of the motion of each axis of the universal robot 2-1, and the actions of the physical axes are performed by a linear axis motor and an instrument motor. The fifth instrument joint 2-234 is equivalent to the surgical instrument such as a scissor, and the scissor is driven by a pair of motors.

In this embodiment, the position of the tail end of the instrument is controlled by the first instrument joint 2-20 and the linear joint 2-21 of the instrument robot 2-2, and the posture of the instrument is controlled by the third instrument joint 2-232, the fourth instrument joint 2-233 and the fifth instrument joint 2-234. The fifth instrument joint 2-234 more specifically controls the operation of the surgical instrument such as the scissor at the surgical end.

In this embodiment, the third instrument joint 2-232, the instrument joint 2-233 and the fifth instrument joint 2-234 all have one rotational degree of freedom.

In a specific embodiment, the universal robot 2-1 may be a multi-axis robot, and each axis of the robot is controlled by a corresponding controller to realize motion. The number of axes of the universal robot 2-1 is greater than or equal to five.

Specifically, the universal robot 2-1 is specifically a seven-axis robot, a six-axis robots, or a five-axis robot. The seven-axis robot has a first universal joint 2-12, a second universal joint 2-13, a third universal joint 2-14, a fourth universal joint 2-15, a fifth universal joint 2-16, a sixth universal joint 2-17, and a seventh universal joint 2-18, which are connected in sequence. The six-axis robot includes a first universal joint 2-12, a second universal joint 2-13, a third universal joint 2-14, a fourth universal joint 2-15, a fifth universal joint 2-16, and a seventh universal joint 2-18, which are connected in sequence. The five-axis robot includes a first universal joint 2-12, a third universal joint 2-14, a fourth universal joint 2-15, a fifth universal joint 2-16, and a seventh universal joint 2-18, which are connected in sequence.

In this embodiment, the first universal joint 2-12, the second universal joint 2-13, the third universal joint 2-14, the fourth universal joint 2-15, the fifth universal joint 2-16, the sixth universal joint 2-17, and the seventh universal joint 2-18 all have one degree of freedom which is either rotational or linear degree of freedom. The rotational degree of freedom may be in the form of rotary axes rotating around an axis, with the rotation planes of adjacent two rotary axes perpendicular to each other.

Correspondingly, the seven-axis robot, the six-axis robots and the five-axis robot each has degrees of freedom corresponding to the number of axes thereof. Through multi-axis rotation with multiple degrees of freedom, the position and the posture are changed through linkage therebetween, which drives the instrument robot 2-2 to change the position and the posture, so that the surgical instrument of the instrument body 2-23 rotates around the surgical wound of the patient, that is, the fixed position of the trocar 2-242 (the laparoscopic puncture device). Furthermore, the linear guide portion 2-211 drives the instrument body 2-23 to pass through the trocar 2-242 and enter the body of the patient, and finally the instrument body 2-23 completes the subsequent surgical operation.

On this basis, an encoder is provided at each joint, that is, each axis of the universal robot 2-1 and the instrument robot 2-2. The encoder may be a rotation angle encoder or a linear displacement encoder, and all the encoders are linked to the controller. A linear displacement sensor is provided at the linear guide portion 2-211, and the linear displacement sensor is linked to the controller.

The angle joint encoder is configured to detect the rotation angle of each axis, and the linear displacement sensor is configured to detect the linear displacement. Through the feedback parameters, the controller can accurately control the motions of the universal robot 2-1 and the instrument robot 2-2, so as to improve the accuracy of motion and control, and ensure the accuracy and efficiency of the surgery.

In this embodiment, the rotation of the axes of the universal robot 2-1 generates rotation in all directions, the motion of the instrument robot 2-2 is amplified, and the universal robot 2-1 moves the instrument robot 2-2 in place with a smaller motion amplitude, which improves the motion flexibility of the instrument main body 2-23 at the tail end, reduces the motion amplitude of the universal robot 2-1, and prevents the multiple robots from interfering with each other during the surgery. Compared with the existing robot configuration, under the same surgical motion range, the motion amplitude range of each axis of the robot in this configuration is smaller and the rate variation is smaller. Therefore, the motion rate at the tail end of the instrument in this configuration is less limited by the maximum motion rate of each axis of the robot, that is, the motion rate of the tail end of the instrument is greater and the action is more flexible. On this basis, due to the smaller motion amplitude of each axis of the robot, the overall action of the robot (especially the portion of elbow) occupies less motion space in clinical practice, which is beneficial to clinical operation. Adjacent surgical robots are less likely to interfere with each other and with clinical personnel.

It should be noted that, terms such as first and second are merely used to distinguish an entity from other entities and do not require or imply that there are any such actual relationships or sequences between these entities herein.

The surgical robot and the surgical robot system according to the present disclosure are described in detail hereinbefore. The principle and embodiments of the present disclosure are described through specific examples herein. The description of the above-described embodiments is merely used to facilitate understanding the method and core idea of the present disclosure. It should be noted that, for those skilled in the art, many improvements and modifications may be further made to the present disclosure without departing from the principle of the present disclosure, and these improvements and modifications also fall within the protection scope of claims of the present disclosure.

What is claimed is:

1. A surgical robot, comprising:
   a first robot arm,
   a second robot arm that is connected to a tail end of the first robot arm and configured for mounting a surgical instrument and controlling a posture of the motion of the surgical instrument, and
   a controller;
   the tail end of the first robot arm is provided with a linear guide portion for the second robot arm to move linearly, the second robot arm is connected to an upper end of the linear guide portion and the first robot arm is connected to a lower end of another side of the linear guide portion, and the second robot arm is configured for mounting the surgical instrument,
   wherein the first robot arm comprises a base and a plurality of rotary joints, the plurality of rotary joints are sequentially connected end to end, and each of the plurality of rotary joints is provided with a motion axis,
   a flange, which is detachably connected with the linear guide portion. is provided at a tail end of the rotary joints at a tail end of the first robot arm,
   the controller is configured to control each rotary joint to rotate around the motion axis so that two orthogonal virtual rotation axes are generated at a position where the second robot arm passes through a trocar; and
   the controller is further configured to control the motion of the second robot arm and perform a linkage control of the first robot arm and the second robot arm.

2. The surgical robot according to claim 1, wherein the second robot arm is detachably connected with the linear guide portion.

3. The surgical robot according to claim 2, wherein a joint encoder for detecting a rotation angle is provided at each motion axis of the plurality of rotary joints of the first robot arm, a displacement detection mechanism for detecting a linear displacement of the second robot arm along the linear guide portion is provided at the linear guide portion, and all the joint encoders and the displacement detection mechanism are connected to the controller.

4. The surgical robot according to claim 1, wherein the first robot arm comprises at least five motion axes.

5. The surgical robot according to claim 4, wherein rotation planes of any two adjacent motion axes of the first robot arm are perpendicular to each other.

6. The surgical robot according to claim 5, wherein a joint encoder for detecting a rotation angle is provided at each motion axis of the plurality of rotary joints of the first robot arm, a displacement detection mechanism for detecting a linear displacement of the second robot arm along the linear guide portion is provided at the linear guide portion, and all the joint encoders and the displacement detection mechanism are connected to the controller.

7. The surgical robot according to claim 4, wherein a joint encoder for detecting a rotation angle is provided at each motion axis of the plurality of rotary joints of the first robot arm, a displacement detection mechanism for detecting a linear displacement of the second robot arm along the linear guide portion is provided at the linear guide portion, and all the joint encoders and the displacement detection mechanism are connected to the controller.

8. The surgical robot according to claim 1, wherein a joint encoder for detecting a rotation angle is provided at each motion axis of the plurality of rotary joints of the first robot arm, a displacement detection mechanism for detecting a linear displacement of the second robot arm along the linear guide portion is provided at the linear guide portion, and all the joint encoders and the displacement detection mechanism are connected to the controller.

9. The surgical robot according to claim 8, wherein the controller comprises a first controller for controlling the motion of each motion axis of the first robot arm and a second controller for controlling the motion of the second robot arm, and the displacement detection mechanism is connected to the second controller.

10. The surgical robot according to claim 9, wherein the displacement detection mechanism is a displacement sensor or an encoder.

11. A surgical robot system, comprising a universal robot and an instrument robot which are connected,
    wherein the universal robot is configured to adjust a position and a posture of the instrument robot, the instrument robot comprises an instrument body and a linear joint which are connected, the linear joint is configured to adjust a position of the instrument body along a linear direction, and the instrument body is configured to adjust a posture of the surgical instrument at an end of the linear joint and perform a setting operation,
    wherein the linear joint has a translational degree of freedom, and the linear joint comprises a linear slide block and a linear guide portion which are assembled slidably,
    wherein the universal robot is connected with the linear guide portion, and the instrument body is connected with the linear slide block,
    wherein the universal robot is provided with a universal robot tail end flange for connecting with the linear quide portion, and the instrument body is provided with an instrument robot tail end flange for connecting with the linear slide block, and
    wherein the universal robot is configured to control the instrument robot to move around a surgical opening of a patient, the linear joint is linked with the universal robot to control a position of the surgical instrument at the end of the instrument robot, and a posture of the surgical instrument is only independently controlled by the instrument robot.

12. The surgical robot system according to claim 11, comprising a trocar seat which is arranged on the linear guide portion, and a trocar which is arranged on the instrument body, and the trocar seat is configured to position and fix the trocar.

13. The surgical robot system according to claim 11, wherein the instrument robot is a four-axis robot with the linear joint, a third instrument joint, a fourth instrument joint and a fifth instrument joint, which are connected in sequence.

14. The surgical robot system according to claim 13, wherein the third instrument joint, the fourth instrument joint and the fifth instrument joint all have a rotational degree of freedom.

15. The surgical robot system according to claim 11, wherein the number of motion axes of the universal robot is greater than or equal to five.

16. The surgical robot system according to claim 15, wherein any motion axis of the universal robot has a rotational degree of freedom or a linear degree of freedom.

* * * * *